June 13, 1939.  F. P. FRANKFORD  2,162,549
AUTOMATIC DRAIN VALVE FOR COMPRESSED AIR RESERVOIRS
Filed Oct. 12, 1937
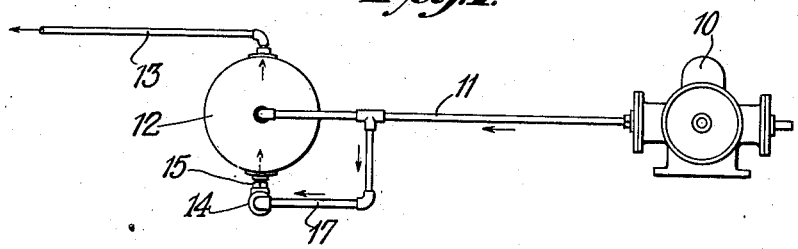
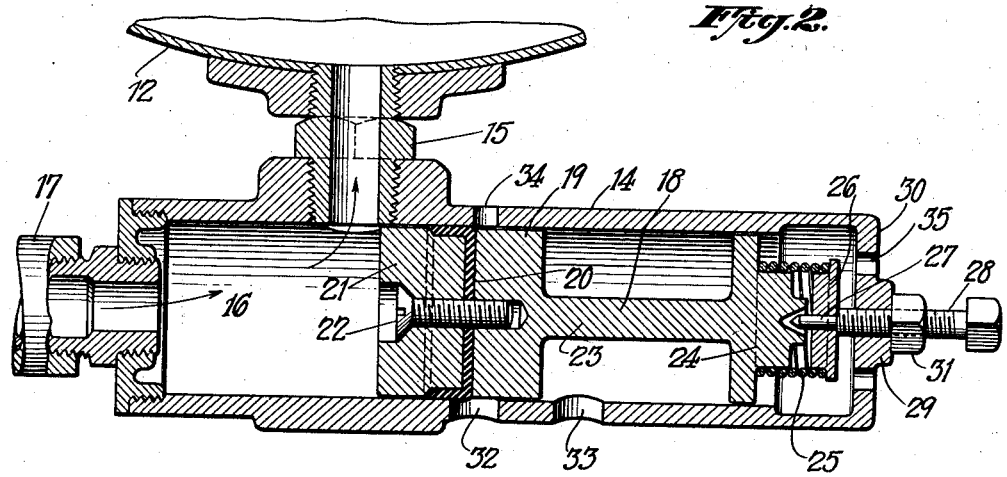
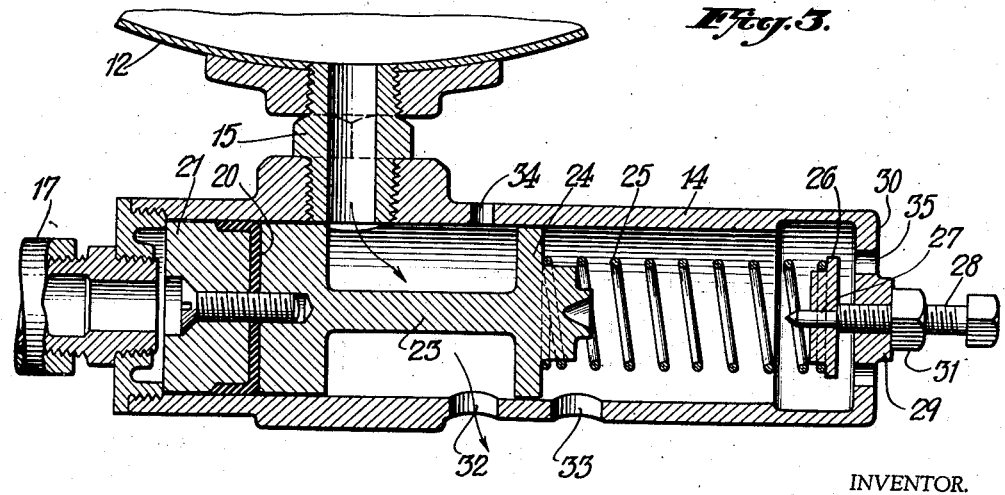
INVENTOR.
FRANK P. FRANKFORD.
BY
ATTORNEYS Patented June 13, 1939

2,162,549

UNITED STATES PATENT OFFICE 2,162,549

AUTOMATIC DRAIN VALVE FOR COMPRESSED AIR RESERVOIRS

Frank P. Frankford, Ridgefield Park, N. J.

Application October 12, 1937, Serial No. 168,545

5 Claims. (Cl. 303—88)

This invention relates to improved means for automatically venting water from air storage reservoirs. While not limited thereto, the invention is particularly useful in discharging the water of condensation from air reservoirs used in the air brake systems of motor buses, railway trains and the like.

The invention will be fully apparent from the following specification, when read in connection with the accompanying drawing, in which—

Fig. 1 is a general view, showing the application of the invention; Fig. 2 is an enlarged central longitudinal section through the automatic drain member embodying the invention, the movable parts being shown in the positions which they occupy when the compressor supplying air to the compressed air reservoir is running normally; Fig. 3 is a view similar to Fig. 2, but illustrating the position which the movable parts assume when the compressor stops running.

Referring in detail to the drawing, 10 represents an air compressor of the type frequently used on motor buses, railway equipment, or the like. This compressor is connected by pipe 11 with a reservoir 12 having an outlet pipe 13 leading to any suitable air brake apparatus. It is known to those skilled in the art that, as a result of condensation, water accumulates in the reservoir. Heretofore, to discharge this water manually operated valves have been placed in the bottom of the reservoir. These reservoirs, when used on motor buses and railway cars, are frequently of necessity located in rather inaccessible positions and due to this fact operators frequently neglect to open the manual drain valves at the necessary intervals. Such neglect results in the forcing of condensed water and accumulated sludge through the piping and to the various devices of the air brake system.

The present invention provides means for automatically venting the water from the reservoir upon the stoppage of the compressor. Hence, for example, at the end of a day's run, when the vehicle is laid up and the compressor stops running, the improved drain member of my invention automatically opens. Thus it is unnecessary for the operator to crawl under the vehicle or to give any attention to the draining of the condensate.

In the embodiment of the invention illustrated, the improved drain member includes a drain valve casing 14, which is connected by suitable threaded spud connector 15 with a boss on the lower portion of the reservoir 12. The spud 15 opens into a chamber 16 of the casing and this chamber is in open communication with the air compressor 10 by way of branch pipe 17, leading to the pipe 11. The pipe 11 may also be connected, as shown, with the reservoir 12.

Movably mounted within the casing 14, there is a valve member, indicated as a whole at 18. This member includes a piston portion made up of a head 19, cup washer 20 and piston head 21. The portions 19, 20 and 21 are held in assembled relationship by an axially extending screw 22, which is threaded into a tapped hole in the end of the head 19. Spaced from the head 19 and united thereto by a shank 23, there is a spring seat 24 with which coacts a compression spring 25. The opposite end of this spring engages a shouldered disc 26, which is mounted on a shank extension 27 of an adjusting screw 28, threaded in a boss 29 in the end wall 30 of the drain valve casing. A lock nut 31 is provided for locking the screw 28 in any desired position of adjustment.

At its underside, the valve casing is provided with discharge openings 32 and 33. Air escape ports 34 and 35 are also provided to prevent the apparatus from becoming air bound.

In normal operation of the parts above referred to, when the compressor is running, air pressure supplied by the compressor 10 forces the piston valve member 18 to the right against the action of the spring 25, so that the movable parts assume the position shown in Fig. 2.

When the air compressor stops running and the air pressure in the reservoir and supply system falls below a predetermined limit, below working pressure, the spring 25 will shift the piston 18 to the left or to the position shown in Fig. 3. This will open direct communication from the interior of the reservoir 12 to the interior of the valve casing 14 and thus permit the water of condensation to escape or be vented through the outlet port 32, as indicated by the arrows in the drawing. When the compressor is again started up, the pressure of air therefrom acting directly on the piston 21 will force the piston valve 18 to the left. At this time, any pocketed air within the valve casing will be permitted to escape through ports 32, 33, 34 and 35.

From the foregoing description, it is apparent that my invention provides an automatic drain member for venting water or other condensate from the air reservoir and means for keeping the drain member closed, so long as the compressor is in operation. When the compressor ceases to operate and the pressure in the reservoir 12 and pipes 11 falls, by leakage or otherwise, below a limit set below working pressures, the drain member is opened to water venting position. Thus, it is apparent that the draining of the reservoir is rendered neglectproof, or foolproof and that bus operators and train crews are relieved of the task of crawling under the vehicle, as heretofore required.

While I have described quite specifically the particular embodiment of the invention herein illustrated it is not to be construed that I am limited thereto since various modifications and substitutions of equivalents may be made by those skilled in the art without departure from the invention as defined in the appended claims.

What I claim is:

1. A compressed air system comprising an air compressor, an air reservoir and a drain member, said drain member being connected to receive air from said air compressor and having a vent and communicating with the lower part of said air reservoir at a point between said vent and said connection to said air compressor and a valve movable from a position between said vent and said communication with said reservoir to a position between said connection with said reservoir and said connection with said air compressor, means to move said valve yieldingly to said latter position with a limited pressure and to permit it to return to its original position under pressure from said compressor.

2. A compressed air system comprising an air compressor, a drain member, a delivery pipe from said air compressor to said drain member, said drain member having a vent, an air reservoir connected to said drain member between said vent and said delivery pipe and a valve movable from a position between said vent and said connection to said reservoir to a position between said connection to said reservoir and said delivery pipe, means to move said valve from the former to the latter position with a limited force and to permit the return of said valve to its original position under pressure from said delivery pipe.

3. A compressed gas system comprising a drain member having a vent, a source of compressed gas connected to said drain member at a point spaced from said vent, a gas reservoir connected to said drain member at a point intermediate said vent and said source of compressed gas, a valve in said drain member movable to positions on opposite sides of the communication to said gas reservoir to place said reservoir alternatively in communication with said compressor and said vent and a spring in said drain member acting with limited pressure to move said valve yieldingly to a position between said source of gas pressure and said gas reservoir.

4. A compressed gas system comprising a drain member having a vent, a source of compressed gas connected to said drain member at a point spaced from said vent, a gas reservoir connected to said drain member at a point intermediate said vent and said source of compressed gas, a valve in said drain member movable to positions on opposite sides of the communication to said gas reservoir to place said reservoir alternatively in communication with said compressor and said vent and a spring in said drain member acting with limited pressure to move said valve yieldingly to a position between said source of gas pressure and said gas reservoir and means to adjust the pressure of said spring on said valve.

5. A compressed air system comprising a source of compressed air, an air reservoir and a drain member comprising a cylinder connected at one end to said source of compressed air and having a vent spaced from said end and connected intermediate said end and said vent to said air reservoir, a piston slidable from position between said vent and said connection to said air reservoir to a position between said connection to said reservoir and said source of compressed air, a spring acting to force said piston to said latter position and means to adjust the pressure exerted by said spring on said valve.

FRANK P. FRANKFORD.